Figure 1:
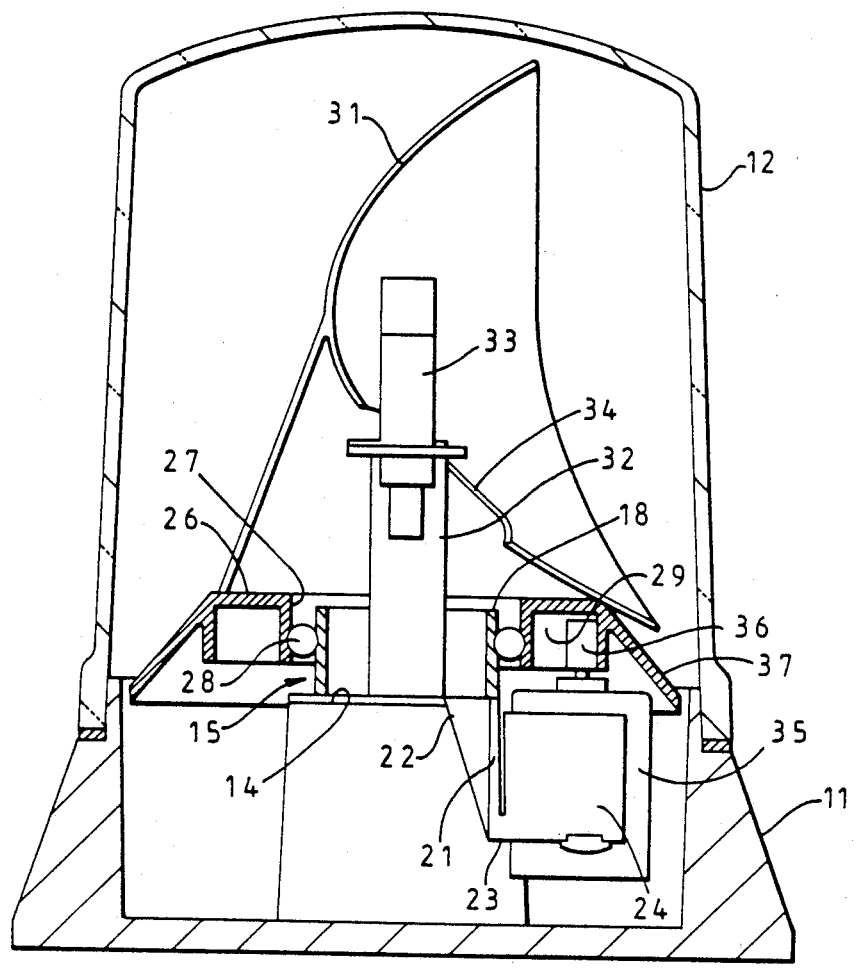

United States Patent

Beaumont et al.

[11] Patent Number: 4,970,627
[45] Date of Patent: Nov. 13, 1990

[54] BEACON LAMP

[75] Inventors: Derek J. Beaumont; Raymond L. Weldon, both of Birmingham, Great Britain

[73] Assignee: Lucas Industries, England

[21] Appl. No.: 366,912

[22] Filed: Jun. 14, 1989

[30] Foreign Application Priority Data

Jun. 17, 1988 [GB] United Kingdom ............... 8814462

[51] Int. Cl.⁵ ............................................. F21V 21/30
[52] U.S. Cl. ..................................... 362/35; 362/272; 362/286
[58] Field of Search ................ 362/35, 272, 274, 285, 362/286, 288, 287; 40/431, 502

[56] References Cited

U.S. PATENT DOCUMENTS 4,205,366 5/1980 Bleiweiss et al. .................. 262/272
4,231,078 10/1980 Hitora ................................... 362/35
4,298,911 11/1981 Headrick ............................. 363/272
4,387,362 6/1983 Gosswiller ........................... 362/35

Primary Examiner—Ira S. Lazarus
Assistant Examiner—Diana M. Cox
Attorney, Agent, or Firm—Andrus, Sceales, Starke & Sawall

[57] ABSTRACT

A beacon lamp comprising a base, a support member fixed in relation to the base and a reflector carrier rotatably mounted on said support member for rotation relative thereto about a first axis. A drive motor carrier is resiliently supported by said support member such that in a rest position the principal axis of the motor carrier is disposed at a small angle to said first axis. An electric motor is supported by said drive motor carrier, and has its output member engaging a cylindrical wall of said reflector carrier, said motor carrier being deflected during positioning of said motor such that said principal axis is rendered substantially parallel with said first axis and said carrier resiliently biases the motor output member against said cylindrical wall of said reflector carrier.

4 Claims, 2 Drawing Sheets

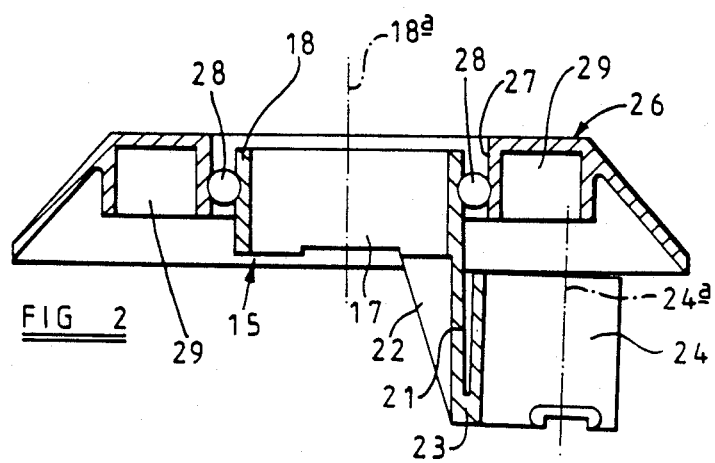
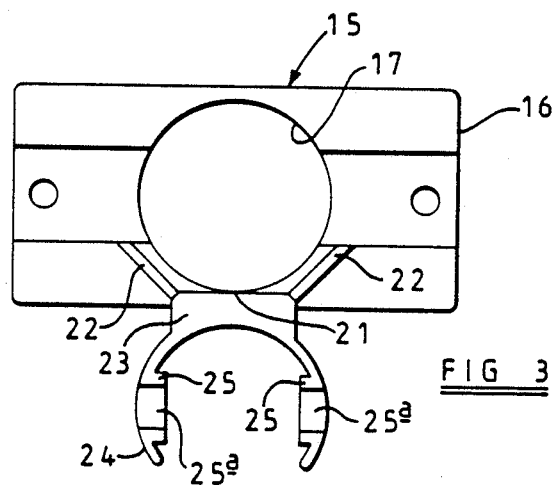
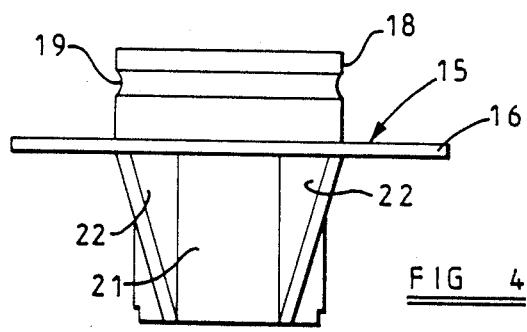

BEACON LAMP

This invention relates to a beacon lamp of the kind intended for use on police or other emergency or service vehicles to provide the effect of a flashing light for drawing attention to the vehicle.

Known beacon lamps comprise a base whereby the lamp is mounted on the vehicle, the base either being a magnetic mount base, where the base has a relatively large surface area and is retained on the metal roof of the vehicle by a permanent magnet, or a spigot mount where the base terminates in a screw threaded hollow spigot bolted through the roof panel, or an associated component, of the vehicle. The base supports a light source in the form of a high intensity electric bulb, and a parabolic reflector is rotatable about the axis of the bulb to provide a flashing effect even though the bulb is continuously energised during use of the beacon lamp. The bulb and rotating reflector are within a housing defined by the base and a transparent or translucent plastic dome attached to the base. The bulb and or the reflector can incorporate colour filters to colour the light emitted, but more usually the plastic dome is formed in an appropriately coloured plastics material. An electric motor secured to the base drives the reflector for rotation.

In the known beacon lamp construction the output of the electric motor is in driving engagement with a rotatable component carrying the reflector. The motor is mounted on a part fixed in relation to the base of the lamp and is secured in position by a plurality of screws or bolts. The positioning of the motor in relation to the rotatable component carrying the reflector is critical to ensure consistent drive transmission and minimal noise generation, and during assembly each beacon lamp must have the position of its motor individually adjusted, and thereafter the mounting screws or bolts must be permanently locked in position. Manual adjustment, and subsequent locking, is disadvantageous in that it increases the manufacturing time of each lamp, and thus the overall cost thereof. It is an object of the present invention to provide a beacon lamp wherein the aforementioned disadvantages are minimised.

In accordance with the present invention there is provided a beacon lamp comprising a base, a support member fixed in relation to the base, a reflector carrier rotatably mounted on said support member for rotation relative thereto about a first axis, a drive motor carrier resiliently supported by said support member such that in a rest position the principal axis of the motor carrier is disposed at a small angle to said first axis, and, an electric motor supported by said drive motor carrier, and having its output member engaging a cylindrical wall of said reflector carrier, said motor carrier being deflected during positioning of said motor such that said principal axis is rendered substantially parallel with said first axis and said carrier resiliently biases the motor output member against said cylindrical wall of said reflector carrier.

Preferably said support member and said drive motor carrier are integral parts of a common synthetic resin moulding.

Desirably said drive motor carrier is connected to the remainder of said support member by means of an integral resilient neck, said neck providing the majority of the flexure which takes place in rendering said principal axis parallel to said first axis during fitting of the motor.

Conveniently the motor is received within said carrier as a snap-fit, the motor and the carrier including cooperating components for locating and retaining the motor.

One example of the invention is illustrated in the accompanying drawings wherein:

FIG. 1 is a partly diagrammatic, longitudinal sectional view of one form of beacon lamp, FIG. 2 is a sectional view of part of the beacon lamp illustrated in FIG. 1, but prior to fitting of a motor, FIG. 3 is an inverted plan view of the support member illustrated in FIG. 2, and FIG. 4 is a side elevational view of the support member illustrated in FIG. 4.

Referring to the drawings it is to be recognised that while the beacon lamp illustrated is designed to be used as a stand-alone component, the invention can, if desired, be applied to the kind of beacon lamp which is incorporated within a lighting bar extending transversely across the top of a vehicle. In such a lighting bar there may be a number of beacon lamps a common housing.

The beacon lamp illustrated in FIG. 1 comprises a magnetic base 11 which is moulded in synthetic resin material, and which supports a permanent magnet (not shown) for retaining the base in position on the roof of a vehicle. The base 11 is generally cylindrical, and closes one end of a moulded synthetic resin dome 12, the dome 12 and the base defining a weather-proof housing. The synthetic resin material from which the dome 12 is moulded is transparent or translucent, and preferably is coloured to suit the application of the beacon lamp, for example emergency vehicles generally are fitted with blue beacon lamps, and for such use the material of the dome 12 would be blue so that the flashing light seen by an observer would appear to be blue.

Within the housing the base defines a pair of coplanar ledges 14 disposed on opposite sides respectively of the longitudinal centre-line of the lamp. Spanning the gap between the ledges 14, and supported thereby, is a moulded synthetic resin support member 15 including a rectangular plate portion 16. In FIGS. 3 and 4 the plate portion 16 is shown as provided with apertures through which the member 15 can be bolted to the ledges 14. However, in an alternative embodiment the plate portion 16 is provided with formations cooperating with corresponding formations on the ledges, whereby the member 15 can be engaged as a non-detachable snap-fit with the ledges.

The plate portion 16 has a centrally disposed aperture 17 the wall of which is extended at the face of the portion 16 which is uppermost in use, to define a hollow, integral spigot 18 of circular cross-section. Intermediate its ends the spigot 18 is formed externally with a circumferentially extending grove 19 of part-circular cross-section.

Integral with the portion 16 of the member 15, and extending perpendicularly from the lower surface thereof is an integral leg 21 supported by a pair of integral walls or buttresses 22. The buttresses 22 render the leg 21 substantially rigid.

At its end remote from the portion 16 the leg 21 is formed with an integral, transversely extending neck 23 interconnecting the leg 21 with an integrally formed drive motor carrier 24 of part cylindrical shape.

The axis of the spigot 18 is illustrated at 18a in FIG. 2, and in use the axis 18a is coincident with the longitudinal axis of the beacon lamp. The axis of the part-cylindrical motor carrier 24 is illustrated in FIG. 2 at 24a, and it can seen that in the rest, unstressed, condition of the member 15 the axis 24a is disposed at a small angle to the axis 18a. The disposition of the axis 24a in relation to the axis 18a is such that the axes would converge somewhere below the member 15. The carrier 24 is C-shaped in transverse cross-section, and includes formations 25 which, in use, cooperate with corresponding formations on the casing of a drive motor to locate the drive motor within the carrier in a predetermined relationship, and to maintain that relationship.

Supported by the member 15, for rotation thereon, is a reflector carrier 26. The reflector carrier 26 is an annular synthetic resin moulding of circular, transverse cross-section, and includes an internal cylindrical wall 27 having a groove therein similar to the groove 19 of the spigot 18. The spigot 18 is received within the central aperture of the carrier 26 and ball bearings 28 engaged in the groove 19 of the spigot 18 and the corresponding groove of the wall 27 support the carrier 26 on the member 15 for rotation relative thereto about the axis 18a. It will be recognised that the spigot 18 constitutes an inner race of the bearing and the wall 27 constitutes an outer race of the bearing. Preferably a ball cage (not shown) will ensure retention and positioning of the balls 28 between the inner and outer races.

As is evident from FIG. 1 a parabolic reflector 31 is supported on the upper surface of the carrier 26 for rotation therewith, and a bulb support 32 carrying a high intensity electric light bulb 33 extends upwardly through the spigot 18. The bulb support 32 and the bulb 33 carried thereby are fixed to the base 11, and the bulb 33 extends through an aperture 34 in the lower portion of the reflector 31 so as to have its filament disposed at, or closely adjacent the focus of the reflector 31. It will be recognised that when the bulb 33 is energised, and the carrier 26 rotates carrying the reflector 31 with it then to a stationary observer there is given the impression of a flashing light of the colour of dome 12.

An electric motor 35 of cylindrical form is provided to drive the carrier 26 and reflector 31. The output of the motor 35 is a shaft carrying a cylindrical roller 36 formed from a synthetic resin, or rubber like, material. The roller 36 is mounted coaxially on the output shaft of the motor, and when the motor is correctly positioned within the carrier 24 the roller 36 extends upwardly into a circumferential channel 29 of rectangular cross-section defined in the lower face of the carrier 26. The side walls of the channel 29 are cylindrical, having their axes coincident with the axis 18a, and the cylindrical roller 36 engages the outmost wall of the channel 29.

It will be recalled that in the rest condition of the member 15 the axis 24a of the carrier 24 is at a small angle to the axis 18a. The carrier 24 is so positioned in relation to the channel 29 that in order for the motor 35 to be correctly engaged in the carrier 24, with the roller 36 having its axis parallel to the axis 18a, then flexure must take place, principally in the neck 23, to permit the axis 24a to be brought to a position parallel, or substantially parallel, with the axis 18a. Such flexure of the neck 23 is facilitated by the neck 23 being the only point of interconnection between the carrier 24 and the leg 21, and the inherent resilience of the neck 23 thus biases the carrier 24 towards its rest position, and so loads the roller 36 against the outer wall of the channel 29 by a predetermined amount such that a consistent drive engagement between the roller 36 and the wall of the channel 29 is achieved, but with a loading which is insufficient to give rise to generation of excessive noise in use.

The motor 35 is engaged in the carrier 24 as a snap-fit. The carrier 26 is engaged with the member 15 prior to fitting of the motor 35, and thus fitting of the motor 35 entails introducing the roller 36 into the channel 29, and then pressing the motor 35 laterally with respect to the carrier 24 so that the curved limbs of the carrier 24 are flexed outwardly to permit lateral insertion of the motor. The motor includes formations which coact with the formations 25 of the carrier to restrain the motor against both axial and angular movement relative to the carrier. It will be recognised therefore that the fitting of the motor is a simple and rapid exercise, and by virtue of the flexure of the neck 23 no subsequent adjustment is needed either to position, nor to lock in position, the motor relative to the member 15. It will be noted that the formations 25 have apertures 25a ensuring a flow of cooling air to the motor 35 in use.

The carrier 26 includes an annular skirt 37 to minimise the possibility of ingress of dust, dirt, or the like into the assembly and the base 11 will include an appropriately positioned aperture through electric leads extend in sealed relationship.

It will be understood that flexure of the neck 23 during fitting of the motor ensures that after fitting of the motor the roller 36 remains in contact at all times with the outer wall of the channel 29 so that even in the event that the roller becomes worn, slippage between the roller and the wall of the channel 29 is unlikely to occur. Moreover, the rubber-like nature of the roller 36 ensures that when rotating the assembly is particularly quiet, and even when the motor is not energised the parts are held against relative movement thereby minimising the risk of noise arising through vibration. The location of the motor within the carrier 24 against both axial and angular movement ensures that the free end of the roller does not contact the base of the channel 29, and ensures that correct positioning of the motor within the assembly is achieved substantially automatically as the motor is snapped into engagement with the carrier.

It will be recognised that if desired both the outer wall of the channel 29 and the surface of the roller 36 can be roughened, or ribbed, to increase the grip therebetween. Moreover if desired other forms of bearing could be provided between the member 15 and the carrier 26.

What is claimed:

1. A beacon lamp comprising a base, a support member fixed in relation to the base, a reflector carrier rotatably mounted on said support member for rotation relative thereto about a first axis, a drive motor carrier resiliently supported by said support member such that in a rest position the principal axis of the motor carrier is disposed at a small angle to said first axis, and, an electric motor supported by said drive motor carrier, and having its output member engaging a cylindrical wall of said reflector carrier, said motor carrier being deflected during positioning of said motor such that said principal axis is rendered substantially parallel with said first axis and said carrier resiliently biases the motor output member against said cylindrical wall of said reflector carrier.

2. A beacon lamp as claimed in claim 1 wherein said support member and said drive motor carrier are integral parts of a common synthetic resin moulding.

3. A beacon lamp as claimed in claim 2 wherein said drive motor carrier is connected to the remainder of said support member by means of an integral resilient neck, said neck providing the majority of the flexure which takes place in rendering said principal axis parallel to said first axis during fitting of the motor.

4. A beacon lamp as claimed in any one of claims 1 to 3 wherein the motor is received within said carrier as a snap-fit, the motor and the carrier including cooperting components for locating and retaining the motor.

* * * * *